(12) United States Patent
Chandrasekaran et al.

(10) Patent No.: US 12,118,820 B2
(45) Date of Patent: Oct. 15, 2024

(54) INFORMATION PROCESSING SYSTEM, INFORMATION PROCESSING METHOD, AND STORAGE MEDIUM FOR ANONYMIZED PERSON DETECTION

(71) Applicant: NEC Corporation, Tokyo (JP)

(72) Inventors: Arun Chandrasekaran, Sacramento, CA (US); Kris Ranganath, Sacramento, CA (US); Thuan La, Sacramento, CA (US)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/619,322

(22) PCT Filed: Jan. 27, 2021

(86) PCT No.: PCT/JP2021/002782
§ 371 (c)(1),
(2) Date: Dec. 15, 2021

(87) PCT Pub. No.: WO2021/153596
PCT Pub. Date: Aug. 5, 2021

(65) Prior Publication Data
US 2022/0101649 A1   Mar. 31, 2022

Related U.S. Application Data

(60) Provisional application No. 62/966,344, filed on Jan. 27, 2020.

(51) Int. Cl.
| | |
|---|---|
| *H04N 23/80* | (2023.01) |
| *G06V 10/20* | (2022.01) |
| *G06V 10/75* | (2022.01) |
| *G06V 40/16* | (2022.01) |
| *H04N 23/611* | (2023.01) |
| *H04N 23/63* | (2023.01) |

(52) U.S. Cl.
CPC .......... *G06V 40/164* (2022.01); *G06V 10/255* (2022.01); *G06V 10/751* (2022.01);
(Continued)

(58) Field of Classification Search
CPC .. G06V 40/164; G06V 10/255; G06V 10/751; G06V 40/166; G06V 40/161;
(Continued)

(56) References Cited

U.S. PATENT DOCUMENTS

| | | | |
|---|---|---|---|
| 2008/0259154 A1 | 10/2008 | Garrison et al. | |
| 2009/0016645 A1* | 1/2009 | Sako | H04N 1/2112 |
| | | | 382/298 |

(Continued)

FOREIGN PATENT DOCUMENTS

| | | | |
|---|---|---|---|
| JP | 2002-49912 A | | 2/2002 |
| JP | 2009284235 A | * | 12/2009 |

(Continued)

OTHER PUBLICATIONS

International Search Report for PCT Application No. PCT/JP2021/002782, mailed on Apr. 27, 2021.
(Continued)

*Primary Examiner* — Stephen P Coleman

(57) ABSTRACT

An apparatus includes: a memory storing one or more instructions; and a processor configured to execute the one or more instructions to: obtain a first image captured by a camera; detect one or more head patterns in the first image; identify a first head pattern, among the one or more head patterns, as a head pattern of a subject closest to the camera based on a size of the first head pattern; obtain a second image based on the identified first head pattern; and display the second image.

5 Claims, 9 Drawing Sheets

(52) U.S. Cl.
CPC ......... *G06V 40/166* (2022.01); *H04N 23/611* (2023.01); *H04N 23/632* (2023.01); *H04N 23/80* (2023.01)

(58) Field of Classification Search
CPC .... H04N 23/611; H04N 23/632; H04N 23/80; H04N 23/617; H04N 7/183
USPC ......................................................... 382/100
See application file for complete search history.

(56) References Cited

U.S. PATENT DOCUMENTS

| | | |
|---|---|---|
| 2015/0085163 A1 | 3/2015 | Aimi et al. |
| 2015/0350560 A1 | 12/2015 | Zhou et al. |
| 2016/0019415 A1* | 1/2016 | Ra .................. G06V 10/761 382/197 |
| 2016/0381013 A1* | 12/2016 | Buscemi ................ H04L 63/10 726/4 |

FOREIGN PATENT DOCUMENTS

| | | |
|---|---|---|
| JP | 2012-010256 A | 1/2012 |
| JP | 5423893 B2 | 2/2014 |
| WO | 2012/001947 A1 | 1/2012 |

OTHER PUBLICATIONS

Communication dated Jun. 7, 2023 issued by the European Patent Office for European Patent Application No. 21747221.6.

* cited by examiner

FIG. 6

Head Detection

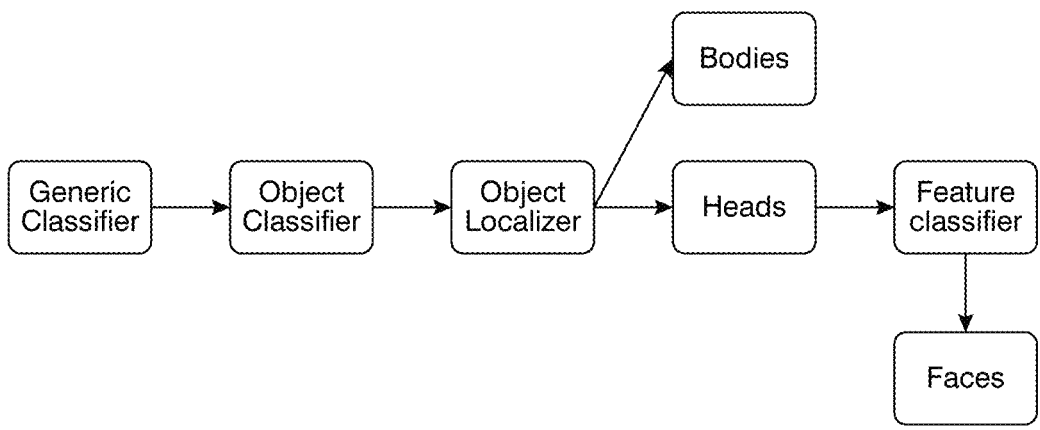

- Object detection requires object classification followed by object localization
- Head detection algorithm uses custom trained Deep Neural Networks (DNN)
- The deeper the network, the higher the accuracy of detection will be
- Consequently, the slower the detection speed
- Proper tuning of DNN to achieve correct balance of speed vs accuracy

| 1 | 2 | 3 |
|---|---|---|
| 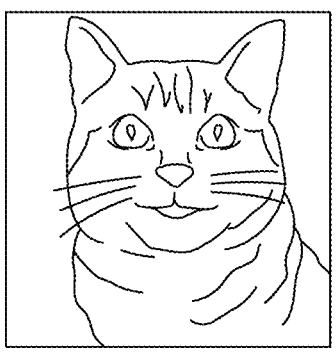 | 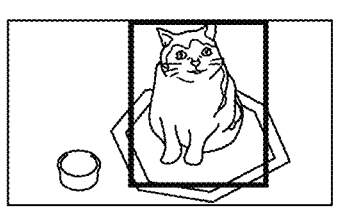 | 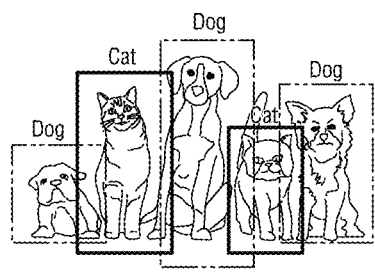 |
| Is this image of Cat or not? | Where is Cat? | Which animals are there in image and where? |
| Image classification problem | Classification with localization problem | Object detection problem |

# INFORMATION PROCESSING SYSTEM, INFORMATION PROCESSING METHOD, AND STORAGE MEDIUM FOR ANONYMIZED PERSON DETECTION

This application is a National Stage Entry of PCT/JP2021/002782 filed on Jan. 27, 2021, which claims priority from U.S. Provisional PATENT APPLICATION 62/966,344 filed on Jan. 27, 2020, the contents of all of which are incorporated herein by reference, in their entirety.

TECHNICAL FIELD

The disclosure relates to an information processing system, an information processing method, and a storage medium, more particularly, to an information processing system, an information processing method, and a storage medium for performing anonymized person detection.

BACKGROUND ART

Conventionally, there exist person detection techniques.

SUMMARY

One or more example embodiments of the disclosure may provide an information processing system, an information processing method, and a storage medium for detecting a person anonymously without performing facial recognition.

According to an aspect of the disclosure, there is provided an information processing apparatus comprising: a memory storing one or more instructions; and a processor configured to execute the one or more instructions to: obtain a first image captured by a camera; detect one or more head patterns in the first image; identify a first head pattern, among the one or more head patterns, as a head pattern of a subject closest to the camera based on a size of the first head pattern; and obtain a second image based on the identified first head pattern; and display the second image.

The processor may be further configured to obtain the second image by acquiring only facial features corresponding to the first head pattern from the camera after receiving a consent from a user to acquire the facial features corresponding to the first head pattern.

The processor may be further configured to obtain the second image by covering all of the one or more head patterns in the first image.

The processor may be further configured to obtain the second image by covering all of the one or more head patterns other than the first head pattern in the first image.

The processor may be further configured to identify the first head pattern by comparing head sizes of each of the one or more head patterns, and identifying a head pattern having the largest head size, among the one or more head patterns, as the head pattern of the subject closest to the camera.

The processor may be further configured to detect the one or more head pattern without using any facial features.

One or more example embodiments of the disclosure will be described below with reference to the attached drawings.

BRIEF DESCRIPTION OF DRAWINGS

FIG. 6 is a second additional diagram and shows an explanation diagram of head detection.

DESCRIPTION OF EXAMPLE EMBODIMENTS

Figure 1:
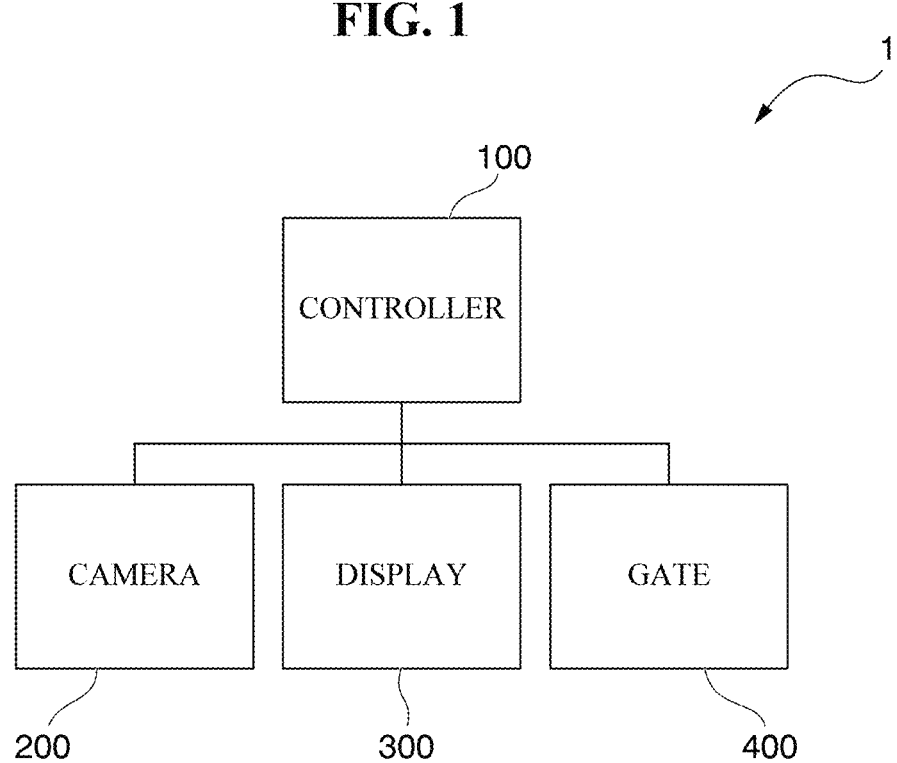
FIG. 1 illustrates an information processing system according to an example embodiment.

FIG. 1 illustrates an information processing system 1 according to an example embodiment, which includes a controller 100, a camera 200 and display 300. According to an embodiment, the information processing system 1 may further include a gate 400 in a security checkpoint for screening people at facilities such airports. In this case, the information processing system 1 may further include an input device that accepts input from a user. According to an embodiment, the input device may be a touchscreen embedded in the display 300, for example. The display 300 may function as a display unit that displays various windows to a user using the automated gate 400. For example, the display 300 may display a guidance window showing how to use the automated gate 400, a notification window to the user, or the like.

The camera 200 may capture an image of the screening area. For example, the camera 200 may be a digital camera that captures a front area of the automated gate apparatus 300. The image may be captured continuously or periodically.

Figure 5:
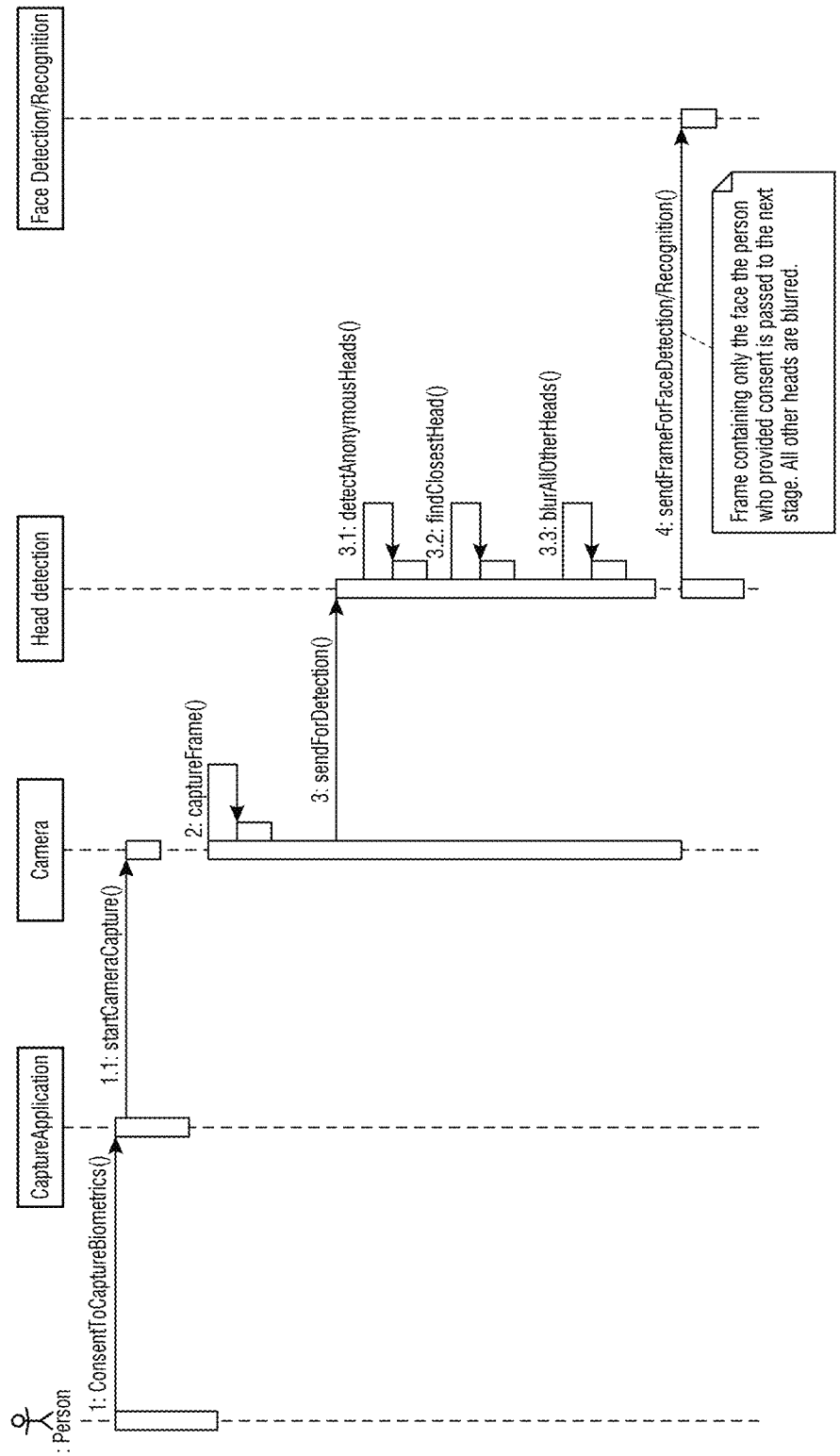
FIG. 5 is a first additional diagram and shows a sequence diagram of anonymized person detection.
Figure 7:
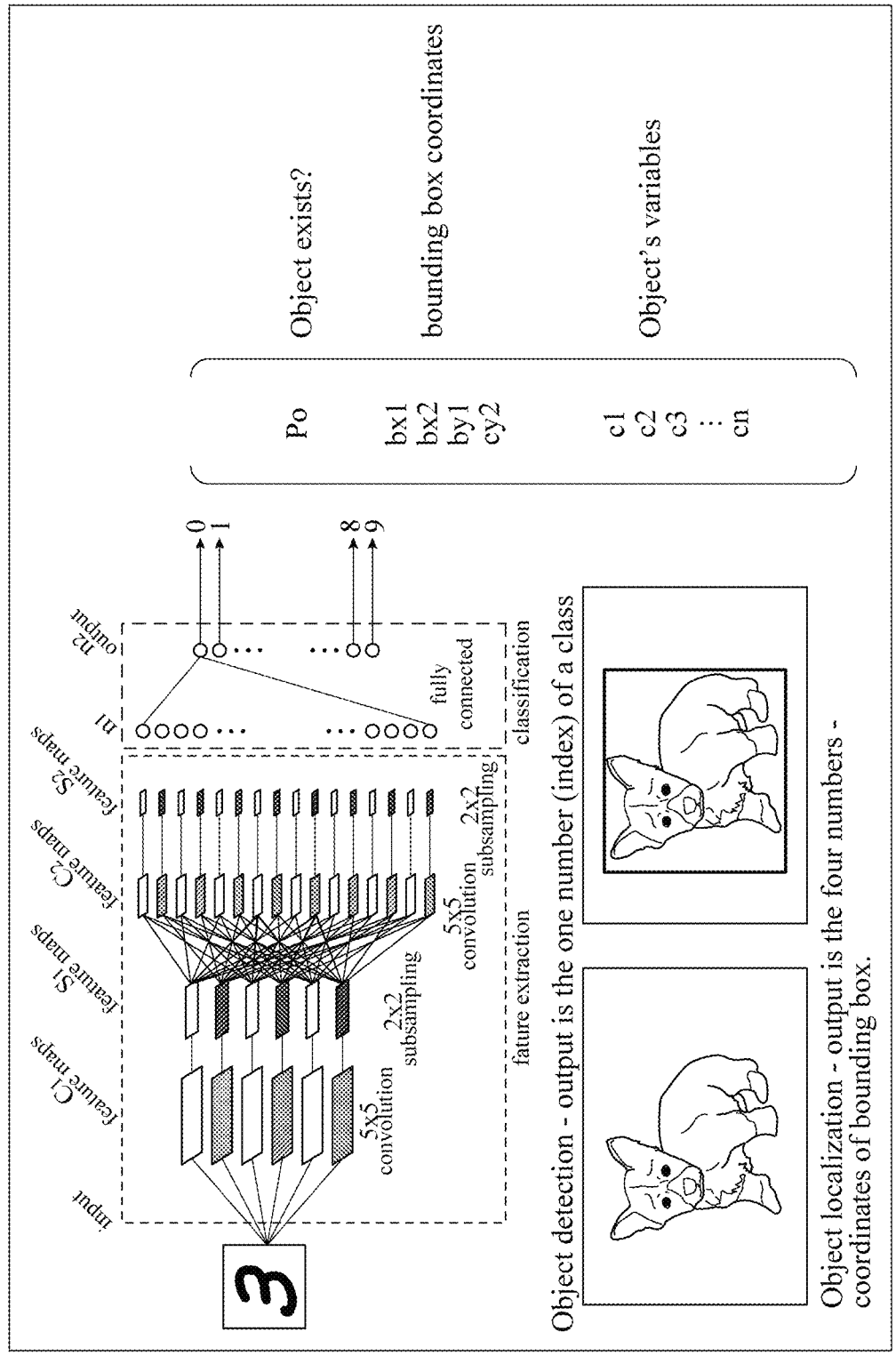
FIG. 7 is a third additional diagram and shows an explanation diagram of object detection and object localization.

According to an example embodiment, the controller 100 may obtain the image from the camera 200 and process the image to detect one or more head patterns within the image. Here, the controller 100 may use Artificial Intelligence (AI) and/or machine learning to detect the head pattern without processing the facial features. For instance, the controller 100 may perform object detection (i.e., head detection) using object classification followed by object localization. According to an embodiment, the head detection algorithm may use custom trained Deep Neural Networks (DNN). As DNN, FAST R-CNN, You Only Look Once (YOLO) or Single Shot Detector (SDD) may be used for example. See also FIGS. 5 to 7. FIG. 5 shows a sequence diagram of anonymized person detection. In the sequence, consent to capture biometrics is performed (Step 1). Then capturing by a camera is stared (Step 1.1). Then, a frame is captured (Step 2). The frame is sent for detection (Step 3). Heads of anonymous persons are detected (Step 3.1). The head of the closest person is found (Step 3.2). The heads of all of the other persons are blurred (Step 3.3). The frame is sent for face detection/recognition (Step 4). FIG. 6 is an explanation diagram of head detection. As shown in FIG. 6, object detection requires object classification followed by object localization. In some embodiments, a head detection algorism uses custom trained Deep Neural Networks (DNN). The deeper the network, the higher the accuracy of detection will be. Consequently, the slower the detection speed. Proper tuning of DNN is performed to achieve correct balance of speed vs accuracy. Part 1 of FIG. 6 shows a case of an image classification program (Is this image of a cat or not?). Part 2 of FIG. 6 shows a case of a classification with localization problem (Where is a cat?). Part 3 of FIG. 6 shows a case of an object detection problem (Which animals are there in the image and where?). FIG. 7 shows an explanation diagram of object detection and object localization. At an upper left side of FIG. 7, there is shown an example of object detection. In this example, output is the one number (index) of a class. At an lower left side of FIG. 7, there is shown an example of object localization. In this example, output is the four numbers, namely, coordinates of bounding box. At a right side of FIG. 7, there is shown an example of outputs of DNN. The outputs include "Po" which indicates whether object exists, "bx1", "bx2", "by1", "cy2" which indicate bounding box coordinates, and "c1", "c2", "c3", ..., "cn" which indicate object's variables.

According to another example embodiment, methods different than AI and/or machine learning may be used to detect the head pattern without processing the facial features.

According to an example embodiment, after detecting the head pattern, the controller 100 may identify the head pattern that is closest to the camera 200 based on a size of the head pattern. For instance, the head pattern that is closest to the camera 200 may be identified before feature classification is performed to process facial features of facial recognition.

While face detection and face recognition are less intrusive biometrics technology as compared to fingerprint or iris recognition methods, the ease at which the facial images can be captured may violate the privacy of the individuals who have not provided consent to biometrics capture. For instance, when face detection is performed in biometrics touchpoints like airport check-in kiosks and e-gates, all the faces in the frame are detected regardless of whether the faces being captured have provided consent to capture or not. However, obtaining a valid consent from the passengers may be necessary to not only protect the privacy of the non-consenting person but also to comply with privacy laws enacted to provide such protection to individuals.

One or more aspects of the disclosure may address this by providing a system, an apparatus and a method which receives consent from a user before facial features are processed by the controller 100 to perform facial recognition. For instance, the privacy of the people who have not provided the consent can be maintained according to the novel features of the disclosure. That is, instead of detecting the faces from the camera frames, only head patterns are detected without associating the head patterns to facial features prior to receiving consent from the user. In this manner, objects that look like human heads are detected from the camera frames without any facial features processing, and based on consent received from a person associated with the detected head, facial features are processed for performing facial recognition.

According to an example embodiment, in a case the controller 100 detects more than one head pattern in the captured image from the camera, the controller 100 may identify the head pattern with the largest size, which is usually the closest head to the camera. After identifying the head that is the closest to the camera, the controller 100 may determine that the user associated with the closest head pattern has provided consent for facial recognition. In this manner, the other heads can be safely ignored and blurred in the frame, thereby not violating their privacy. The heads region may or may not include a face and by limiting the detection to only the closest head to the camera, biometrics of people who have provided consent only are captured.

According to an embodiment, the controller 100 may determine that the user associated with the closest head pattern has provided consent for facial recognition based on the head pattern being within a specific distance from the camera. For instance, if a user is very close to the camera (i.e., less than about 1 or 2 feet), it may be determined that the user has consented to the facial recognition since the user has taken an active step to be present so near the camera.

According to another example embodiment, the controller 100 may determine that the user associated with the closest head pattern has provided consent for facial recognition based on a response from the user in response to an inquiry to the user to provide consent. For instance, the head pattern being within a specific distance from the camera.

According to an embodiment, even if, only one head pattern is identified by the controller 100, the controller 100 may perform the above described operation to determine whether consent has been received from the user. For instance, if the detected head pattern is within a specific distance from the camera, facial features associated with the detected head pattern may be processed. If not, the facial region, associated with the detected head pattern may be covered or blurred.

Figure 3A:
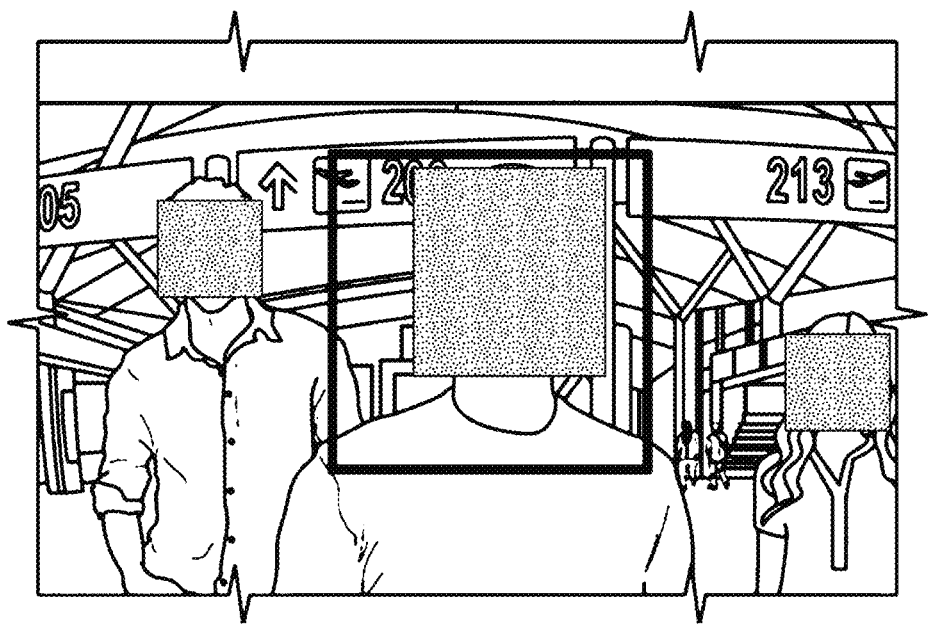
FIG. 3A illustrates an image in which all the head regions are blurred or covered.
Figure 3B:
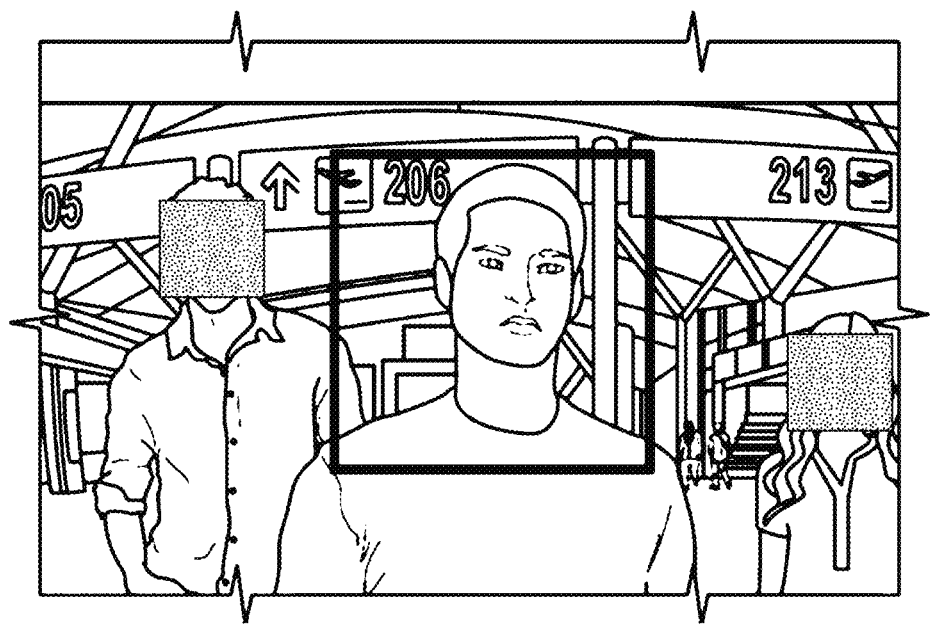
FIG. 3B illustrates an image in which the head region of the person who has consented in uncovered or unblurred and the remaining head regions of the all persons who are not closest to the camera are covered, or blurred.
Figure 3C:
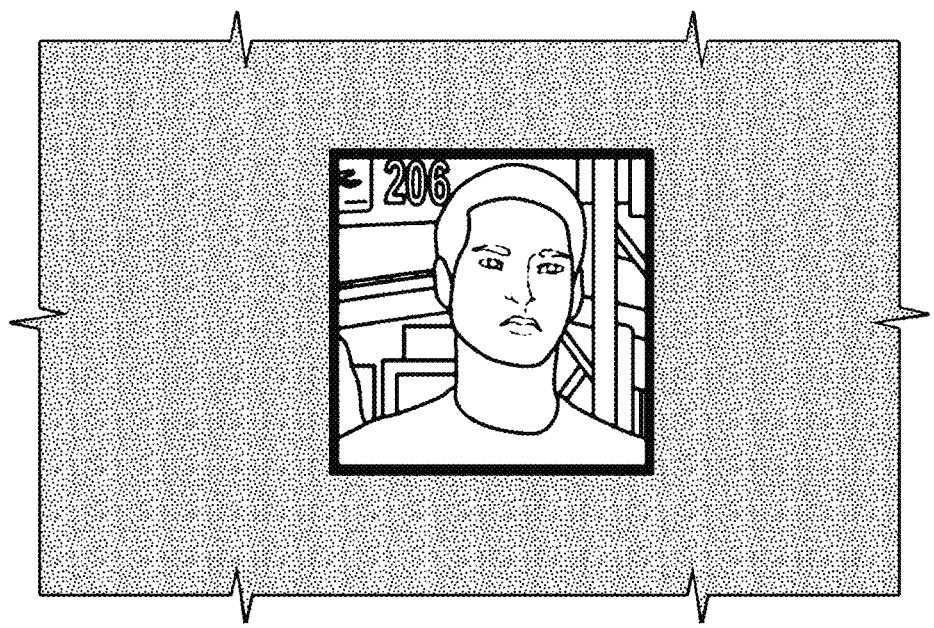
FIG. 3C illustrates an image in which the entire frame, except the head region of the person closest to the camera who has consented is covered or blurred.

According to an embodiment, all the head regions in the captured image are blurred or covered prior to receiving consent from a user as illustrated in FIG. 3A. According to another embodiment, the entire frame may be blurred prior to receiving consent. Thereafter, only the head region of the person who has consented in uncovered or unblurred and the remaining head regions of the all persons who are not closest to the camera are covered, or blurred, as illustrated in FIG. 3B. According to another embodiment, the entire frame, except the head region of the person closest to the camera who has consented is covered or blurred as illustrated in FIG. 3C. As such, the privacy of the non-consenting persons are not violated.

According to an embodiment, after the consented persons head region is uncovered or unblurred, facial processing and facial recognition may be perform in the uncovered head region using AI and machine learning, such as feature classification (See FIGS. 5 to 7 for example). Based on the result from the facial recognition, the controller 100 may control the gate 400 to open or close. For instance, if the controller 100 determines that the detected faces is stored in a database and is authenticated, the controller 100 may control the gate 400 to be opened. If the detected face is not stored in the database, the gate 400 will remain closed.

The disclosure is not limited to an automated gate apparatus described above but can be changed as appropriate within a range not departing from the spirit of the disclosure.

Figure 2:
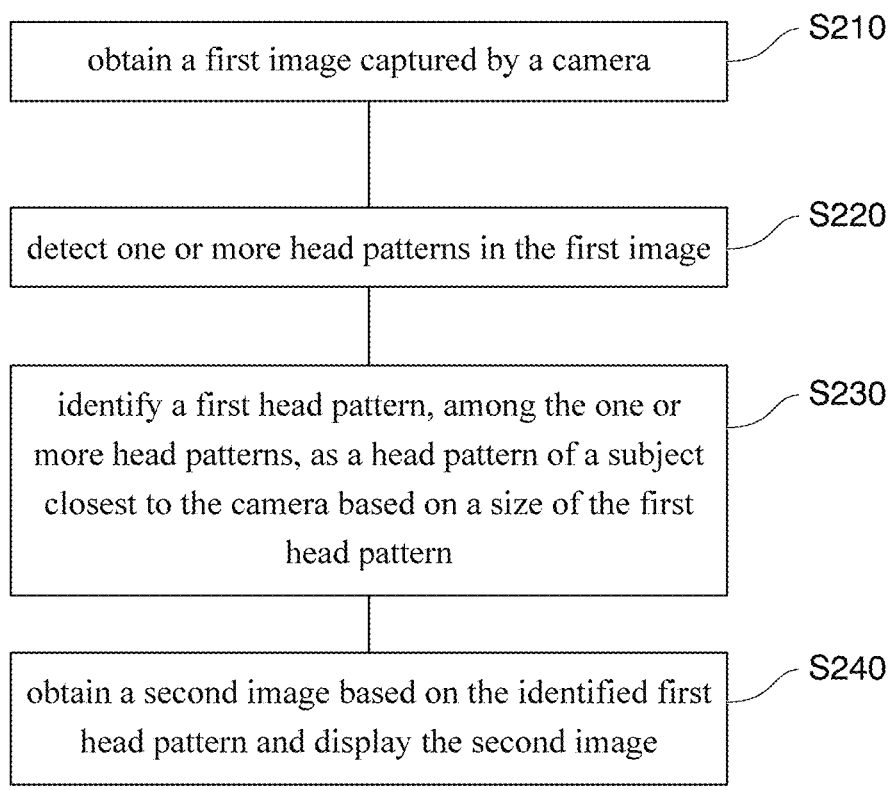
FIG. 2 is a flowchart illustrating the outline of the process performed by the information processing system for performing the anonymized person detection.

FIG. 2 is a flowchart illustrating the outline of the process performed by the information processing system for performing the anonymized person detection.

In S210, the controller 100 may obtain a first image captured by a camera 200. According to an example embodiment, the first image may be an image of the environment surrounding a kiosk in an airport terminal at a security check point.

In S220, the controller 100 may detect one or more head patterns in the first image. According to an embodiment, the controller 100 may detect the one or more head patterns by performing head detection using AI or machine learning. According to an embodiment, the controller 100 may detect the one or more head patterns without using any facial features. For instance, the controller 100 may use one or more of the head detection methods illustrated in FIGS. 5 to 7.

In S230, the controller 100 may identify a first head pattern, among the one or more head patterns, as a head pattern of a subject closest to the camera based on a size of the first head pattern. For instance, the controller 100 may identify the closest head pattern by comparing head sizes of each of the one or more head patterns, and identifying a head pattern having the largest head size, among the one or more head patterns, as the head pattern of the subject closest to the camera.

In S240, the controller 100 obtains a second image based on the identified first head pattern and displays the second image on the display 300. According to an embodiment, controller 100 may obtain the second image by acquiring only facial features corresponding to the first head pattern from the camera after receiving a consent from a user to acquire the facial features corresponding to the first head pattern.

According to an embodiment, the controller 100 may obtain the second image by covering all of the one or more head patterns in the first image as illustrated in FIG. 3A. According to another embodiment, the controller 100 may obtain the second image by covering all of the one or more head patterns other than the first head pattern in the first image as illustrated in FIG. 3B. According to another embodiment, the entire frame, except the head region of the person closest to the camera who has consented is covered as illustrated in FIG. 3C.

(Exemplary Case Scenarios)

Case 1: Two or more persons are standing far away from the camera, in which case, both the head patterns may be blurred or covered and no facial recognition performed on both head patterns.

Case 2: Two persons standing, where a person on the right is closer to the camera than a person on the left (and is looking away). In this case, the head region of the person on the left is blurred so that the head pattern is not processed will not be processed. And if the person on the right is within a specific distance from the camera and/or has consented, facial recognition may be performed for only the person on the right. According to another embodiment, only the head region of the person on the right is visible and rest of the frame has been blurred so that it will not be processed.

Case 3: Two persons standing, where a person on the right is closer to the camera than a person on the left (and is looking at the camera). In this case, the head region of the person on the left is blurred so that the head pattern is not processed will not be processed. And in the person on the right is within a specific distance from the camera and/or has consented, facial recognition may be performed for only the person on the right. According to another embodiment, only the head region of the person on the right is visible and rest of the frame has been blurred so that it will not be processed.

Figure 4:
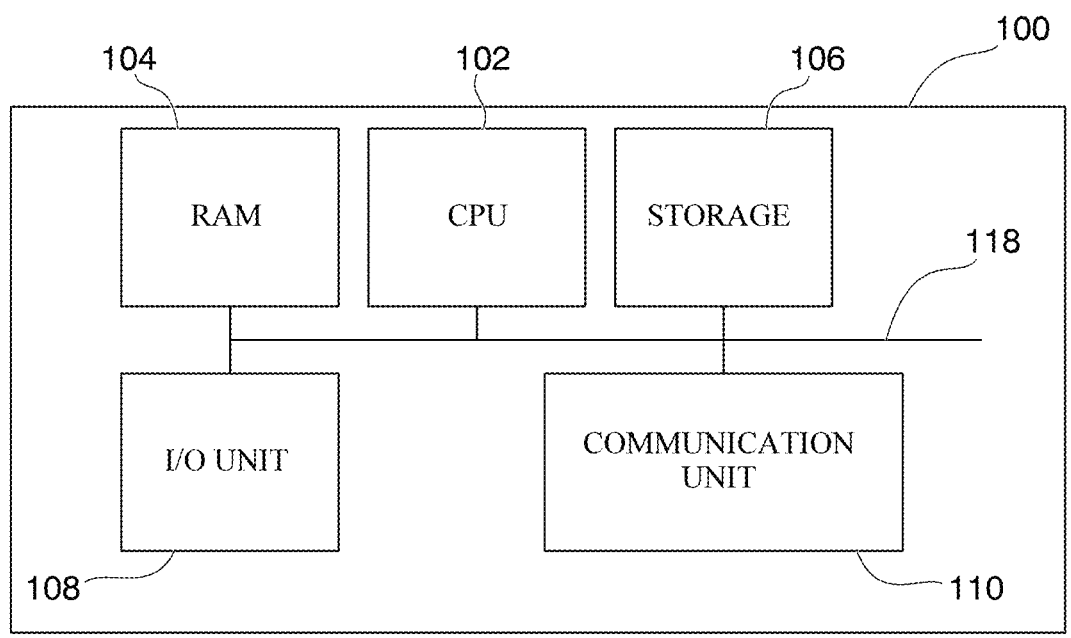
FIG. 4 illustrates a block diagram of a hardware configuration of a controller according to an example embodiment.

FIG. 4 illustrates a block diagram of a hardware configuration of the controller 100 according to an example embodiment. According to an embodiment, the controller has a CPU 102, a RAM 104, a storage device 106, an I/O (input/output) unit 108 and a communication unit 110. The CPU 102, the RAM 104, the storage device 106, the I/O unit 108 and the communication unit 116 are connected to a bus line 118.

The CPU 102 may function as a control unit that operates by executing a program stored in the storage device 106 and controls the operation of the information processing system. Further, the CPU 102 may execute an application program stored in the storage device 106 to perform various processes as the automated gate apparatus 1. The RAM 104 may provide a memory field necessary for the operation of the CPU 102.

The storage device 106 may be formed of a storage medium such as a nonvolatile memory, a hard disk drive, or the like and functions as a storage unit. The storage device 106 may store a program executed by the CPU 102, data referenced by the CPU 102 when the program is executed, or the like.

The I/O unit 108 may be connected to input and/or output devices to facilitated user interface and receive input from the external.

The communication unit 110 may be connected to a network and may transmit and receive data via the network. The communication unit 110 communicates with a server or the like under the control of the CPU 102.

While the information processing apparatus and systems used in facial recognition for gate control have been illustrated as examples in each of the above example embodiments, the disclosure is also applicable to areas of facial recognition and body tracking other than gate control by appropriately changing the configuration of the one or more example embodiments.

The scope of one or more example embodiments also includes a processing method of storing, in a storage medium, a program that causes the configuration of the example embodiment to operate to implement the function of the example embodiment described above, reading out as a code the program stored in the storage medium, and executing the code in a computer. That is, a computer readable storage medium is also included in the scope of each example embodiment. Further, not only the storage medium in which the program described above is stored but also the program itself is included in each example embodiment. Further, one or more components included in the example embodiments described above may be a circuit such as an Application Specific Integrated Circuit (ASIC), a Field Programmable Gate Array (FPGA), or the like configured to implement the function of each component.

As the storage medium, for example, a floppy (registered trademark) disk, a hard disk, an optical disk, a magneto-optical disk, a Compact Disk (CD)-ROM, a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

The service implemented by the function of one or more example embodiments described above can be provided to the user in a form of Software as a Service (SaaS).

Note that all the example embodiments described above are mere examples of embodiments in implementing the disclosure, and the technical scope of the disclosure should not be construed in a limiting sense by these example embodiments. That is, the disclosure can be implemented in various forms without departing from the technical concept thereof or the primary feature thereof.

This application is based upon and claims the benefit of priority from U.S. provisional patent application No. 62/966,344, filed Jan. 27, 2020, the disclosure of which is incorporated herein in its entirety.

What is claimed is:

1. An apparatus comprising:
a memory storing one or more instructions; and
a processor configured to execute the one or more instructions to:
obtain a first image captured by a camera;
detect head regions in the first image;
identify a first head region, among the head regions, as a head region of a subject closest to the camera based on a size of the first head region;
obtain a second image based on the identified first head region; and
display the second image,
wherein the processor is configured to obtain the second image by:
prior to receiving consent from the subject, obtaining, as the second image, an image in which all of the head regions in the first image are covered or blurred;
determining that the subject has provided consent for a facial recognition when the subject is associated with the head region closest to the camera and is looking at the camera; and
after receiving the consent from the subject, obtaining, as the second image, an image in which all of the head regions other than the first head region in the first image are covered or blurred.

2. The apparatus of claim 1, wherein the processor is further configured to identify the first head region by comparing head sizes of the head regions, and identifying which of the head regions has a largest head size, among the head regions, as the head region of the subject closest to the camera.

3. The apparatus of claim 1,
wherein detecting head regions in the first image is performed without performing facial recognition, and
wherein the processor is configured to process facial features of the subject for performing the facial recognition based on the consent received from the subject.

4. A method comprising:
obtaining, by a processor, a first image captured by a camera;
detecting, by the processor, head regions in the first image;
identifying, by the processor, a first head region, among the head regions, as a head region of a subject closest to the camera based on a size of the first head region;
obtaining, by the processor, a second image based on the identified first head region; and
displaying, by the processor, the second image,
wherein obtaining the second image comprises:
prior to receiving consent from the subject, obtaining, as the second image, an image in which all of the head regions in the first image are covered or blurred;
determining that the subject has provided consent for a facial recognition when the subject is associated with the head region closest to the camera and is looking at the camera; and
after receiving the consent from the subject, obtaining, as the second image, an image in which all of the head regions other than the first head region in the first image are covered or blurred.

5. A non-transitory storage medium storing a program that when executable by a computer causes the computer to execute:
obtaining a first image captured by a camera;
detecting head regions in the first image;
identifying a first head region, among the head regions, as a head region of a subject closest to the camera based on a size of the first head region;
obtaining a second image based on the identified first head region; and
displaying the second image,
wherein obtaining the second image comprises:
prior to receiving consent from the subject, obtaining, as the second image, an image in which all of the head regions in the first image are covered or blurred;
determining that the subject has provided consent for a facial recognition when the subject is associated with the head region closest to the camera and is looking at the camera; and
after receiving the consent from the subject, obtaining, as the second image, an image in which all of the head regions other than the first head region in the first image are covered or blurred.

* * * * *